United States Patent [19]

Hanselmann et al.

[11] 3,772,644
[45] Nov. 13, 1973

[54] VEHICLE SEAT LOADING INDICATOR APPARATUS

[75] Inventors: Dieter Hanselmann; Willy Bock; Hans Prohaska, all of Bietigheim, Germany

[73] Assignee: SWF-Spezialfabrik fur Autozubehor Gustav Rau GmbH, Bietigheim, Germany

[22] Filed: Apr. 10, 1972

[21] Appl. No.: 242,338

[30] Foreign Application Priority Data
Apr. 15, 1971 Germany.................. P 71 14 410.0

[52] U.S. Cl. ............ 340/52 R, 340/52 E, 340/278, 200/85 A
[51] Int. Cl. .......................................... B60r 21/10
[58] Field of Search ............ 340/52 R, 52 D, 52 E, 340/278; 200/85 A; 180/82 C; 307/10.5 B

[56] References Cited
UNITED STATES PATENTS 3,437,993  4/1969  Recio et al. ............... 340/52 E UX
1,387,798  8/1921  Miller........................... 340/278 UX
1,229,473  6/1917  Keenan............................... 340/278

Primary Examiner—Alvin H. Waring
Attorney—John J. McGlew et al.

[57] ABSTRACT

A device for indicating the loading of a seat, particularly a passenger seat in a motor vehicle comprises, a car seat having a resilient spring suspension for supporting a person and a switch for indicating the loading of the seat by the person located adjacent said spring suspension. The spring suspension carries resilient actuating means in the form of a resilient actuating element which is suspended from the horizontally extending portion of the spring suspension at a location underlying the upholstery of the seat and which has an actuator end which is engaged on a resilient actuating element of the switch. The resilient actuating element is movable when a person sits on a seat to cause it to actuate the switch.

10 Claims, 2 Drawing Figures

VEHICLE SEAT LOADING INDICATOR APPARATUS

BACKGROUND OF THE INVENTION

1. FIELD OF THE INVENTION

This invention relates in general to indicating devices and, in particular, to a new and useful device for indicating a load on a seat of a motor vehicle.

2. DESCRIPTION OF THE PRIOR ART

The present invention is particularly applicable to motor vehicles and to safety devices therefor. For example, in order to ensure that the driver of an automobile has applied safety belts before he starts the vehicle, it is desirable to have some means to obtain an indication that he has taken his place on the passenger seat and has not fastened the safety belt as yet. A disadvantage of the known devices is that they are complicated in construction, not always reliable, and they are expensive.

SUMMARY OF THE INVENTION

In accordance with the invention, there is provided a device for generating a signal or an actuating pulse in response to the loading of a motor vehicle seat. The present invention provides a switch device for a vehicle seat which is actuated when the seat is loaded and which includes a resilient actuating member which is carried on a spring suspension of the seat and which is movable with the spring suspension upon loading to actuate a resilient element of a switch. The switch is advantageously mounted on a base portion of the seat directly below a spring frame suspension which underlies the upholstery of the seat. The resilient spring suspension sags when occupied and loaded and causes a resilient actuating member to contact a pressure actuating button of a switch to cause the actuation. The switch may be arranged to control a break, make a change-over contact, or carry out another electrical function, depending upon the monitoring circuit.

With the inventive construction, it was found that it is possible to use the interior area of the seat for carrying a resilient actuator for the switch. The actuator must be resilient in order to accommodate the great variations of the sagging of the resilient spring suspension of the seat in dependence upon the weight of the passenger and the distribution of his weight over the surface of the seat. In addition, comparatively large manufacturing tolerances and deflections have to be taken into account due to the aging of the seat. These large movements of the resilient seat cannot act directly on the pressure switch without seriously impairing the resilient actuator of the switch or the spring mounting of the seat. The invention provides an arrangement of the resilient actuating means in association with a spring suspension which uses the sagging of the seat to control the movement of a pressure actuated switch.

In one embodiment of the invention, the resilient actuating means comprises a spring wire which is preferably in contact with the resilient spring suspension of the seat and is hooked on this spring frame adjacent the back of the seat. The spring wire is advantageously curved at the front of the seat and rests freely on the actuating member of the switch. The switch is advantageously positioned on a base portion of the seat adjacent the front end thereof and within the interior of the seat frame. The device is such that the actuating element with the switch may be mounted on the underside of any existing automobile seat. The resilient spring wire may have a round or any desired cross-section. In order to ensure that the actuating element which extends over the entire depth of the seat is sufficiently connected to the seat, it is also proposed that the spring wire should be adjustably mounted and a guide connected to the spring suspension of the seat. The resilient actuating wire is advantageously disposed in the longitudinal center of the seat, that is, the part which sags to the greatest extent when the seat is loaded. One end of the actuating element is advantageously bent at an angle by the spring suspension of the seat and is secured to the frame of the spring suspension. The free actuating end of the resilient actuating element is advantageously bent to form a spring loop to provide independent resilience of the actuating element itself. The guide on the underside of the seat permits the actuating element on the seat to be adjusted to fit the sag of the seat. The spring wire, in a perferred embodiment, is secured to the spring frame by a clamping sleeve which engages around the underside of the horizontally extending spring suspension.

When control of the pressure switch is to be derived from a comparatively large area of the seat, it is then advantageous to provide two resilient actuating elements spaced apart laterally and which are supported on the underside of the seat and separately secured to the frame of the spring suspension preferably directly below the upholstery. The free actuating ends thereof are connected to form a common actuating point for the actuating member of the pressure switch. With such an arrangement, the distribution of the load on the seat is immaterial to the actuation of the switch. The pressure switch will be actuated even when the seat is unevenly loaded. The actuating ends of the resilient actuating elements are connected together by means of a clamping sleeve and thus form a common actuating end for the actuating member of the pressure switch.

A plurality of resilient actuating elements with an associated pressure switch may be spaced laterally away from each other on the underside of the resilient seat and the pressure switches may be connected in parallel. The actuating elements, with their associated pressure switches, form units each of which can be secured at suitable points on the underside of the seat. These units may be used for various types of seats. Preferably, resilient coverings are applied over the actuating elements, and these may comprise, for example, a layer of plastic material which is located particularly in areas which are subjected to displacement and frictional wear or chafing.

Accordingly, it is an object of the invention to provide a device for indicating loading of a seat, particularly a seat in a motor vehicle, which comprises a pressure actuated switch having a pressure actuator extending outwardly from a switch body and a resilient actuating element secured to the spring suspension of a seat and being resiliently engaged against the actuating button of the switch and being movable upon loading of the seat to actuate the switch.

A further object of the invention is to provide a seat loading device which comprises a resilient wire rod system which may be secured to the underside frame of a seat spring suspension at two laterally spaced locations and which includes end portions which are joined together by a common sleeve and which terminate in an actuating element which is engaged over the actuating button of a switch.

A further object of the invention is to provide a device for indicating the loading of seats which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
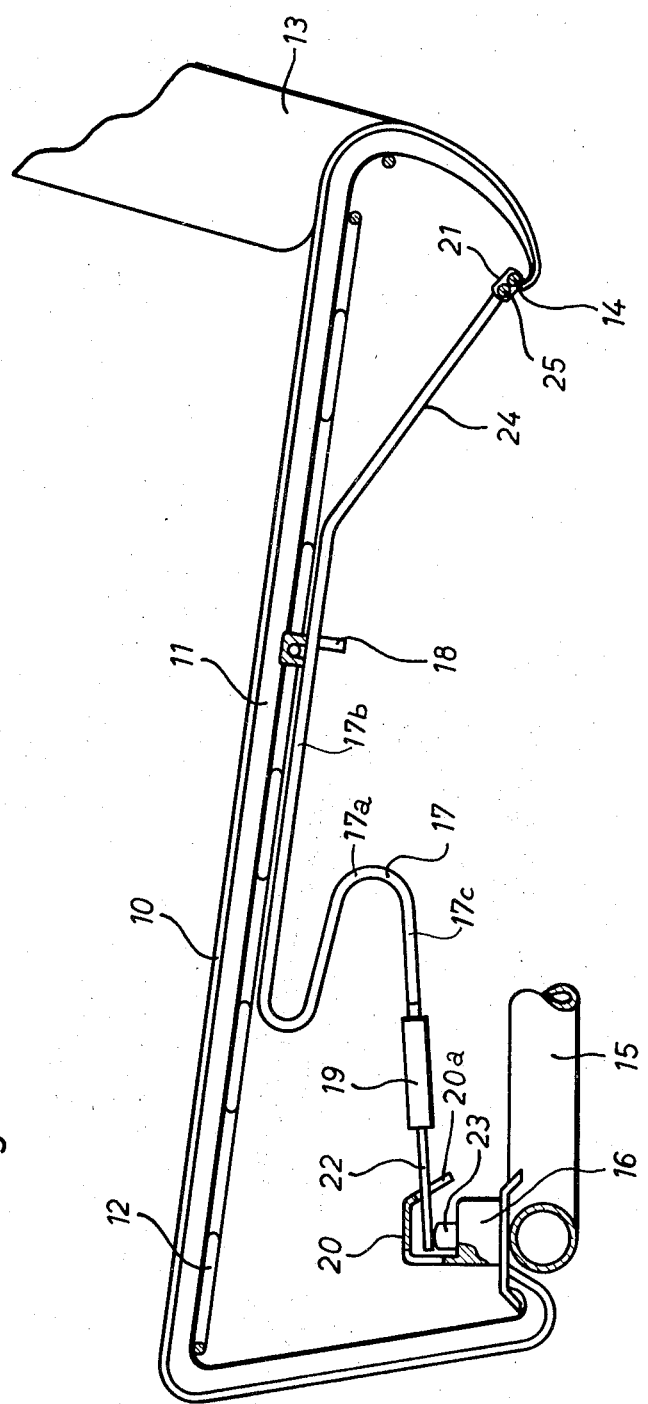
FIG. 1 is a longitudinal sectional view through a passenger seat of a motor vehicle having a seat loading indicator constructed in accordance with the invention.

Referring to the drawings in particular, the invention embodied therein comprises, a device for indicating the loading of an automobile passenger seat which includes a base portion 15 onto which a spring suspension frame 12 is secured. The suspension frame 12 includes a rear spring frame portion 14 and the seat includes an outer covering 10 over upholstery 11. In the embodiment shown, the seat also includes a back portion 13 which is connected to the rear end of the seat. The spring frame 12 comprises an element of the spring suspension which, in most instances, also includes helical or coil springs (not shown). The coil springs (not shown) extend between the seating surface which comprises the seat cover 10 and the upholstery 11 and the spring suspension 12 and the base 15.

In accordance with the invention, a pressure actuated switch 16 having a resilient pressure actuator or button 23 is mounted over one end of the base portion 15 and it is covered by a plate 20 having a forked end 20a with leg portions between which an actuator end 22 of resilient actuating means extend. The leg portion 20a provides guides for the actuating end 22 which advantageously rests on the actuating button 23.

In accordance with a feature of the invention, the actuating means comprises a spring rod or actuator element 17 which is formed as a spring wire, and it includes a resilient looped portion 17a located below a horizontally extending portion 17b which is secured to the underside of the horizontally extending portion of the spring suspension 12. The horizontal portion of the spring suspension 12 carries a guide collar 18 which is secured around the horizontal portion 17b of the actuating element 17 preferably in the longitudinal center of the spring at the location which is subjected to the greatest sagging during loading. The spring rod 17 also includes an obliquely extending portion or angle portion 24 which extends rearwardly and downwardly into a loop 25 which is secured to the rear frame portion 14 by a clamping sleeve 21. The clamping sleeve 21 advantageously permits pivoting of the actuating element 17. At least the front actuator end portion 22, and preferably the bend or loop 17a of the actuating element 17, is designed as a spring in order to increase the spring action.

It can be easily seen that when the seat sags under load the resilient actuating element 17 operates the pressure switch 16. The spring loop 17a accommodates a deep sagging of the seat without the actuating member 23 being moved beyond its actuating position. The pressure switch 16 therefore remains actuated independently of the sagging degree of the seat and does not change its position when the sag of the seat changes during travel and with the movements of the person seated thereon.

Figure 2:
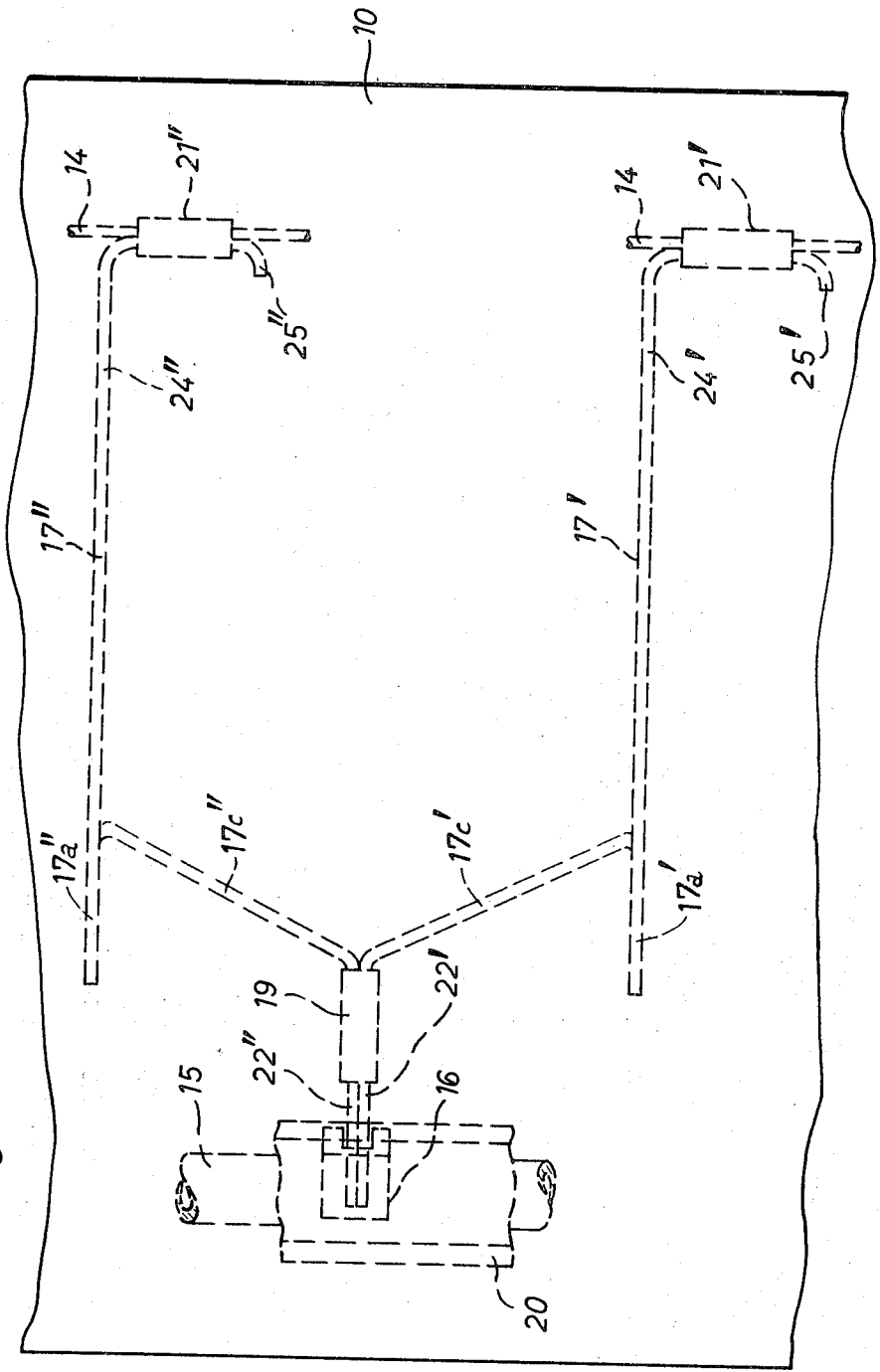
FIG. 2 is an enlarged schematic bottom plan view indicating the connection of the indicating device to the underside of the seat shown in FIG. 1.

As best indicated in FIG. 2, the underside of the resilient seat is provided with two portions of the actuating element, namely, 17' and 17''. The elements 17' and 17'' are secured as described in respect to FIG. 1 by the guide 18 and also by the clamping sleeve 21 to the spring suspension 12. FIG. 2 is designed to show that the actuating element may comprise many portions, in this instance, two separate leg portions 17' and 17''. They are secured at the back frame portion 14 by the clamping sleeves 21' and 21'' in the same manner as indicated in FIG. 1. The actuating ends of the resilient actuating elements 17' and 17'' include inwardly extending portions 17c' and 17c'', respectively, which extend from the loop portions 17a' and 17a'', respectively, inwardly and engage through the common clamping sleeve 19 and extend outwardly to terminate in resilient contact ends 22' and 22''. In this construction, the widely spaced elements 17' and 17'' give indications of the seat sagging at laterally spaced locations but both indications are connected through the common clamping sleeve 19 to the actuating ends 22' and 22''. Both ends 22' and 22'' extend into the forked end 20a of the guide cover 20 and rest in contact with the actuator button 23 of the switch 16. Thus, the seat device is actuated from a comparatively large area of the surface of the seat and also responds when the seat is unevenly loaded. Both actuating element portions 17' and 17'' have a spring action due to the spring loops 17a' and 17a'', but they are separately connected to the spring suspension 12.

While a specific embodiment of the invention has been shown and described in detail to illustrate the application of the principles of the invention, it will be understood that the invention may be embodied otherwise without departing from such principles.

What is claimed is:

1. A device for indicating the loading of a seat, particularly a passenger seat in a motor vehicle, comprising a seat having a resilient spring suspension for supporting a person, a switch for indicating the loading of the seat and having a pressure actuated switch button located adjacent said spring suspension, and resilient switch actuating means secured to said spring suspension and having a portion overlying said actuator button and being movable upon loading of said seat and movement of said spring suspension to actuate said switch, said seat including a generally U-shaped spring suspension having a seat covering thereon and having a generally horizontal top portion, a front generally vertical leg portion and a rear generally vertical leg portion, a seat base frame adjacent the front leg portion, said switch being mounted on the base frame, said resilient switch actuating means comprising a resilient member secured to said spring suspension horizontal portion and having a resilient loop extending downwardly inside said seat and forwardly into overlying engagement with said switch button, and a guide overlying said switch and having a forked leg portion, said resilient member having an actuating end extending through between said leg portions and being guided thereby into engagement with said switch button.

2. A device for indicating the loading of a seat, according to claim 1, including clamping means on said horizontal portion of said spring suspension holding said resilient actuating member, said resilient actuating member including a rearwardly and downwardly extending portion engaged at the lower end of said rear leg.

3. A device for indicating the loading of a seat, according to claim 2, including a clamping sleeve secured to said spring suspension rear leg portion at the lower end thereof and carrying the rear end of said resilient actuating member.

4. A device for indicating the loading of a seat, particularly a passenger seat of a motor vehicle, comprising a seat comprising a spring suspension frame of generally U-shaped longitudinal profile having a forward generally vertical leg portion and a rear generally vertical leg portion connected by an intermediate generally horizontal portion and including a base frame adjacent the bottom end of the forward leg portion, a pressure switch mounted on said base frame and having a resilient actuating button, at least one resilient actuating member comprising a rod like element including a generally horizontally extending portion secured to the underside of said horizontal portion of said spring suspension and an actuator end portion overlying said actuating button, guide means for guiding the actuator end of said rod member, said rod member being flexible with flexure of said spring suspension to actuate said switch.

5. A device for indicating the loading of a seat, according to claim 4, wherein said rod member includes a downwardly and rearwardly extending portion pivotally connected to the bottom end of said rear leg portion of said spring suspension.

6. A device for indicating the loading of a seat, according to claim 4, wherein said at least one resilient actuating member comprises two laterally spaced spring rod members underlying said horizontal spring suspension at two laterally spaced locations and having forward ends directed together and terminating in front actuator ends overlying said switch button.

7. A device for indicating the loading of a seat, according to claim 6, including a clamping sleeve secured to the front ends of said two rod members together adjacent said switch actuating button.

8. A device for indicating the loading of a seat, according to claim 4, wherein said resilient member comprises a spring rod having a resilient covering thereon and including a loop portion between the horizontal portion secured to said spring suspension and the actuator end overlying said actuating button.

9. A device for indicating the loading of a seat, according to claim 4, wherein said guide means includes an angle cover plate overlying said button and having two spaced apart leg portions between which said actuator end of said rod member extends.

10. A device for indicating the loading of a seat, according to claim 4, wherein said resilient actuating member comprises a horizontal portion secured below the horizontal portion of said spring suspension, and engagement portion overlying said actuating button and at least one resilient loop portion between said engaging portion and said horizontal portion.

* * * * *